United States Patent
Zhang

(10) Patent No.: US 10,002,050 B1
(45) Date of Patent: Jun. 19, 2018

(54) SYSTEMS AND METHODS FOR IMPROVING REHYDRATION PERFORMANCE IN DATA DEDUPLICATION SYSTEMS

(71) Applicant: Veritas Technologies LLC, Mountain View, CA (US)

(72) Inventor: Lei Hu Zhang, Beijing (CN)

(73) Assignee: Veritas Technologies LLC, Mountain City, CA (US)

(*) Notice: Subject to any disclaimer, the term of this patent is extended or adjusted under 35 U.S.C. 154(b) by 402 days.

(21) Appl. No.: 14/745,501

(22) Filed: Jun. 22, 2015

(51) Int. Cl.
- *G06F 17/00* (2006.01)
- *G06F 7/00* (2006.01)
- *G06F 11/14* (2006.01)
- *G06F 17/30* (2006.01)

(52) U.S. Cl.
CPC .... *G06F 11/1453* (2013.01); *G06F 17/30156* (2013.01); *G06F 2201/84* (2013.01)

(58) Field of Classification Search
CPC ......... G06F 17/30156; G06F 17/30159; G06F 17/30371; G06F 17/30303; G06F 17/30575; G06F 3/0641; G06F 3/0608; G06F 3/061; G06F 11/1453; G06F 11/1402
USPC ...................................................... 707/692
See application file for complete search history.

(56) References Cited

U.S. PATENT DOCUMENTS

| | | | |
|---|---|---|---|
| 9,367,559 B1* | 6/2016 | Zhang ................. | G06F 11/1451 |
| 2012/0084268 A1* | 4/2012 | Vijayan ................ | G06F 3/0652 |
| | | | 707/692 |
| 2013/0339319 A1* | 12/2013 | Woodward ........ | G06F 17/30581 |
| | | | 707/692 |
| 2014/0006363 A1* | 1/2014 | Constantinescu .... | G11B 27/032 |
| | | | 707/692 |
| 2014/0006858 A1* | 1/2014 | Helfman ............. | G06F 11/1448 |
| | | | 714/19 |
| 2014/0244599 A1* | 8/2014 | Zhang .................. | G06F 3/0608 |
| | | | 707/692 |
| 2014/0344229 A1* | 11/2014 | Lillibridge ........... | G06F 3/0608 |
| | | | 707/692 |

(Continued)

OTHER PUBLICATIONS

Alioune Thiam, et al.; Systems and Methods for Facilitating Fault-Tolerant Backup Jobs; U.S. Appl. No. 14/032,615, filed Sep. 20, 2013.

(Continued)

*Primary Examiner* — Dung K Chau
(74) *Attorney, Agent, or Firm* — FisherBroyles LLP

(57) ABSTRACT

The disclosed computer-implemented method for improving rehydration performance in data deduplication systems may include (1) identifying a set of data containers that include data segments referenced by a backup image stored in a data deduplication system, (2) determining the total number of data segments referenced by the backup image that are included in a data container within the set of data containers, (3) determining that the total number of data segments that are referenced by the backup image and included in the data container is below a certain threshold, and then (4) rebasing the data segments that are referenced by the backup image and included in the data container to at least one other data container to decrease the total number of data containers that include the data segments referenced by the backup image. Various other methods, systems, and computer-readable media are also disclosed.

10 Claims, 10 Drawing Sheets

(56) References Cited

U.S. PATENT DOCUMENTS

| | | | | |
|---|---|---|---|---|
| 2014/0358871 A1* | 12/2014 | Cideciyan | ......... | G06F 17/30156 707/692 |
| 2014/0365449 A1* | 12/2014 | Chambliss | ........ | G06F 17/30303 707/692 |
| 2015/0106345 A1* | 4/2015 | Trimble | ............ | G06F 17/30156 707/692 |
| 2016/0042008 A1* | 2/2016 | Tripathy | ........... | G06F 17/30159 707/692 |
| 2016/0283372 A1* | 9/2016 | Davis | .................. | G06F 12/0261 |

OTHER PUBLICATIONS

David Teater, et al.; Systems and Methods for Creating Optimized Synthetic Backup Images; U.S. Appl. No. 13/915,682, filed Jun. 12, 2013.

Vishal Bajpai, et al.; Systems and Methods for Leveraging Data-Deduplication Capabilities of File Systems; U.S. Appl. No. 14/026,980, filed Sep. 13, 2013.

Sudhakar Paulzagade, et al.; Systems and Methods for Modifying Track Logs During Restore Processes; U.S. Appl. No. 14/283,742, filed May 21, 2014.

Xianbo Zhang, et al.; Data Locality Control for a Deduplication System; U.S. Appl. No. 14/094,527, filed Dec. 2, 2013.

Xianbo Zhang, et al.; Constrained Backup Image Defragmentation Optimization within Deduplication System; U.S. Appl. No. 13/459,987, filed Apr. 30, 2012.

* cited by examiner

```
                              Temporary Array
                                    600
--------------------------------------------------------------------------------
************************************************

[1]     Reference 210(12) to Data Segment 214(12) in Data Container 212(4)
[2]     Reference 210(5) to Data Segment 214(5) in Data Container 212(2)
[3]     Reference 210(11) to Data Segment 214(11) in Data Container 212(2)
[4]     Reference 210(18) to Data Segment 214(18) in Data Container 212(2)
[5]     Reference 210(1) to Data Segment 214(1) in Data Container 212(1)
[6]     Reference 210(2) to Data Segment 214(2) in Data Container 212(1)
[7]     Reference 210(3) to Data Segment 214(3) in Data Container 212(1)
[8]     Reference 210(4) to Data Segment 214(4) in Data Container 212(1)
[9]     Reference 210(7) to Data Segment 214(7) in Data Container 212(1)
[10]    Reference 210(17) to Data Segment 214(17) in Data Container 212(1)
[11]    Reference 210(6) to Data Segment 214(6) in Data Container 212(3)
[12]    Reference 210(8) to Data Segment 214(8) in Data Container 212(3)
[13]    Reference 210(9) to Data Segment 214(9) in Data Container 212(3)
[14]    Reference 210(10) to Data Segment 214(10) in Data Container 212(3)
[15]    Reference 210(13) to Data Segment 214(13) in Data Container 212(3)
[16]    Reference 210(14) to Data Segment 214(14) in Data Container 212(3)
[17]    Reference 210(15) to Data Segment 214(15) in Data Container 212(3)
[18]    Reference 210(16) to Data Segment 214(16) in Data Container 212(3)
[19]    Reference 210(19) to Data Segment 214(19) in Data Container 212(3)
[20]    Reference 210(20) to Data Segment 214(20) in Data Container 212(3)
  •                       •
  •                       •
  •                       •

```
                          Rebased Backup Image
                                  800
-----------------------------------------------------------------------
*********************************************

[1]     Reference 210(1) to Data Segment 214(1) in Data Container 212(1)
[2]     Reference 210(2) to Data Segment 214(2) in Data Container 212(1)
[3]     Reference 210(3) to Data Segment 214(3) in Data Container 212(1)
[4]     Reference 210(4) to Data Segment 214(4) in Data Container 212(1)
[5]     Reference 210(5) to Data Segment 214(5) in Data Container 212(1)
[6]     Reference 210(6) to Data Segment 214(6) in Data Container 212(3)
[7]     Reference 210(7) to Data Segment 214(7) in Data Container 212(1)
[8]     Reference 210(8) to Data Segment 214(8) in Data Container 212(3)
[9]     Reference 210(9) to Data Segment 214(9) in Data Container 212(3)
[10]    Reference 210(10) to Data Segment 214(10) in Data Container 212(3)
[11]    Reference 210(11) to Data Segment 214(11) in Data Container 212(1)
[12]    Reference 210(12) to Data Segment 214(12) in Data Container 212(3)
[13]    Reference 210(13) to Data Segment 214(13) in Data Container 212(3)
[14]    Reference 210(14) to Data Segment 214(14) in Data Container 212(3)
[15]    Reference 210(15) to Data Segment 214(15) in Data Container 212(3)
[16]    Reference 210(16) to Data Segment 214(16) in Data Container 212(3)
[17]    Reference 210(17) to Data Segment 214(17) in Data Container 212(1)
[18]    Reference 210(18) to Data Segment 214(18) in Data Container 212(1)
[19]    Reference 210(19) to Data Segment 214(19) in Data Container 212(3)
[20]    Reference 210(20) to Data Segment 214(20) in Data Container 212(3)
   •                        •
   •                        •
   •                        •

SYSTEMS AND METHODS FOR IMPROVING REHYDRATION PERFORMANCE IN DATA DEDUPLICATION SYSTEMS

BACKGROUND

Data deduplication often reduces the amount of storage space needed to store backup images by identifying redundant data patterns within similar files. For example, a backup and restore technology may capture a backup image of a client device and identify various data segments that are included in both the backup image and a conventional deduplication system. Rather than storing multiple instances of those data segments to the conventional deduplication system, the backup and restore technology may configure the backup image to simply reference those data segments already stored on the conventional deduplication system. By configuring the backup image to reference those data segments already stored on the conventional deduplication system, the backup and restore technology may reduce the amount of storage space needed to store the backup image on the conventional deduplication system.

Unfortunately, as the number of backup images backed up to the conventional deduplication system increases, the number of data containers used to store the data segments from those backup images may also increase. As a result, the data segments referenced by latter backup images may get scattered throughout various data containers within the conventional deduplication system, thus worsening the locality of those data segments. Furthermore, as the locality of the data segments worsens, the amount of time needed to read and/or restore files that include those data segments from the conventional deduplication system may increase. This process of reading and/or restoring such files is sometimes referred to as "rehydration". Accordingly, as the number of data containers used by a backup image increases, the rehydration performance of that backup image may decrease.

The instant disclosure, therefore, identifies and addresses a need for additional and improved systems and methods for improving rehydration performance in data deduplication systems.

SUMMARY

As will be described in greater detail below, the instant disclosure describes various systems and methods for improving rehydration performance in data deduplication systems by decreasing the number of data containers used by backup images and thus achieving better locality of the data segments referenced by those backup images.

In some examples, a computer-implemented method for improving rehydration performance in data deduplication systems may include (1) identifying a set of data containers that include data segments referenced by a backup image stored in a data deduplication system, (2) determining the total number of data segments referenced by the backup image that are included in a data container within the set of data containers, (3) determining that the total number of data segments that are referenced by the backup image and included in the data container is below a certain threshold, and then in response to determining that the total number of data segments is below the certain threshold, (4) rebasing the data segments that are referenced by the backup image and included in the data container to at least one other data container to decrease the total number of data containers that include the data segments referenced by the backup image.

In some examples, the method may also include copying the data segments from the data container to at least one other data container within the set of data containers. Additionally or alternatively, the method may include copying the data segments from the data container to at least one other data container not included in the set of data containers.

In some examples, the method may also include scanning the backup image. In such examples, the method may further include identifying, while scanning the backup image, a set of references within the backup image that reference the data segments included in the set of data containers.

In some examples, the method may also include identifying a first data container that includes a first data segment referenced by a first reference within the backup image and then determining the total number of data segments that are referenced by the set of references within the backup image and included in the first data container. In such examples, the method may further include identifying a second data container that includes a second data segment referenced by a second reference within the backup image and then determining the total number of data segments that are referenced by the set of references within the backup image and included in the second data container. Additionally or alternatively, the method may include determining that the total number of data segments that are referenced by the set of references and included in the first data container is less than the total number of data segments that are referenced by the set of references and included in the second data container. Finally, the method may include reordering the set of references such that the first reference is listed ahead of the second reference due at least in part to the total number of data segments that are referenced by the set of references and included in the first data container being less than the total number of data segments that are referenced by the set of references and included in the second data container.

In some examples, the method may also include identifying a first data container that includes a first set of data segments referenced by a first subset of references within the backup image and then determining the total data size of the first set of data segments. In such examples, the method may further include identifying a second data container that includes a second set of data segments referenced by a second subset of references within the backup image and then determining the total data size of the second set of data segments. Additionally or alternatively, the method may include determining that the total data size of the first set of data segments is less than the total data size of the second set of data segments. Finally, the method may include reordering the set of references such that the first subset of references are listed ahead of the second subset of references due at least in part to the total data size of the first set of data segments being less than the total data size of the second set of data segments.

In some examples, the method may also include identifying an original index position of a first reference included in the set of references within the backup image. In such examples, the method may further include identifying an original index position of a second reference included in the set of references within the backup image. Additionally or alternatively, the method may include determining that the original index position of the first reference is ahead of the original index position of the second reference within the backup image. Finally, the method may include reordering the set of references such that the first reference is maintained ahead of the second reference due at least in part to the original index position of the first reference having been ahead of the original index position of the second reference within the backup image prior to the reordering of the set of references.

In some examples, the method may also include copying the set of references from the backup image to a temporary array within the data deduplication system. In such examples, the method may further include reordering the set of references within the temporary array based at least in part on (1) the total number of data segments that are referenced by the set of references and included in any single data container, (2) the total data size of the data segments that are referenced by the set of references and included in any single data container, and (3) original index positions of the set of references within the backup image.

In some examples, the method may also include updating the backup image to account for the data segments that have been rebased from the data container to the other data container. Additionally or alternatively, the method may further include dynamically calculating the certain threshold based at least in part on the total number of data segments referenced by the backup image and the total number of data containers that include the data segments referenced by the backup image.

In some examples, a system for implementing the above-described method may include (1) an identification module, stored in memory, that identifies a set of data containers that include data segments referenced by a backup image stored in a data deduplication system, (2) a determination module, stored in memory, that (A) determines the total number of data segments referenced by the backup image that are included in a data container within the set of data containers and (B) determines that the total number of data segments that are referenced by the backup image and included in the data container is below a certain threshold, (3) a rebase module, stored in memory, that rebases, in response to the determination that the total number of data segments is below the certain threshold, the data segments that are referenced by the backup image and included in the data container to at least one other data container to decrease the total number of data containers that include the data segments referenced by the backup image, and (4) at least one physical processor configured to execute the identification module, the determination module, and the rebase module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a set of data containers that include data segments referenced by a backup image stored in a data deduplication system, (2) determine the total number of data segments referenced by the backup image that are included in a data container within the set of data containers, (3) determine that the total number of data segments that are referenced by the backup image and included in the data container is below a certain threshold, and then in response to the determination that the total number of data segments is below the certain threshold, (4) rebase the data segments that are referenced by the backup image and included in the data container to at least one other data container to decrease the total number of data containers that include the data segments referenced by the backup image.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 6 is an illustration of an exemplary temporary array of references copied from a backup image stored on a data deduplication system.

FIG. 8 is an illustration of an exemplary backup image that has been updated to account for rebased data segments.

Figure 1:
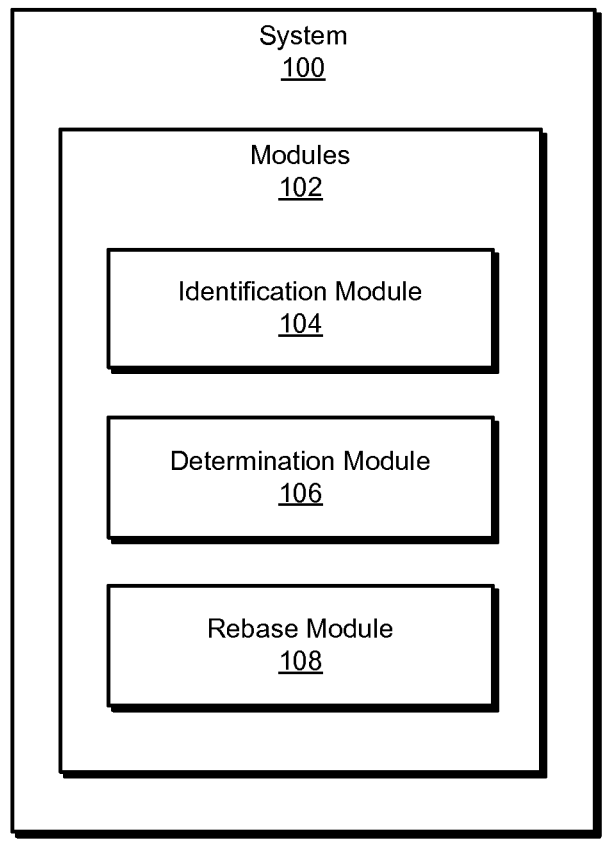
FIG. 1 is a block diagram of an exemplary system for improving rehydration performance in data deduplication systems.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for improving rehydration performance in data deduplication systems. As will be explained in greater detail below, the systems and method described herein may identify data containers that include data segments referenced by a backup image. These systems and methods may then determine that the total number of data segments that are referenced by the backup image and included in one of the data containers is below a certain threshold. In response to this determination, these systems and methods may rebase the data segments that are referenced by the backup image and included in that data container to another data container to decrease the total number of data containers that include the data segments referenced by the backup image.

By decreasing the total number of data containers that include the data segments referenced by the backup image, these systems and methods may improve the locality of the data segments referenced by the backup image. Moreover, by improving the locality of the data segments referenced by the backup image, these systems and methods may decrease the amount of time needed to read and/or restore files that include those data segments from the data deduplication system, thereby improving the rehydration performance of the backup image.

Additionally or alternatively, these systems and methods may prioritize the data segments likely to qualify for rebasing so that most, if not all, of those data segments are successfully rebased within the limited amount of time (e.g., 60 seconds) allotted to the rebase operation. As a result, these systems and methods may be able to eliminate or at least reduce the amount of interruption to the rebase operation while the data segments in need of rebasing are copied from one data container to another.

Figure 2:
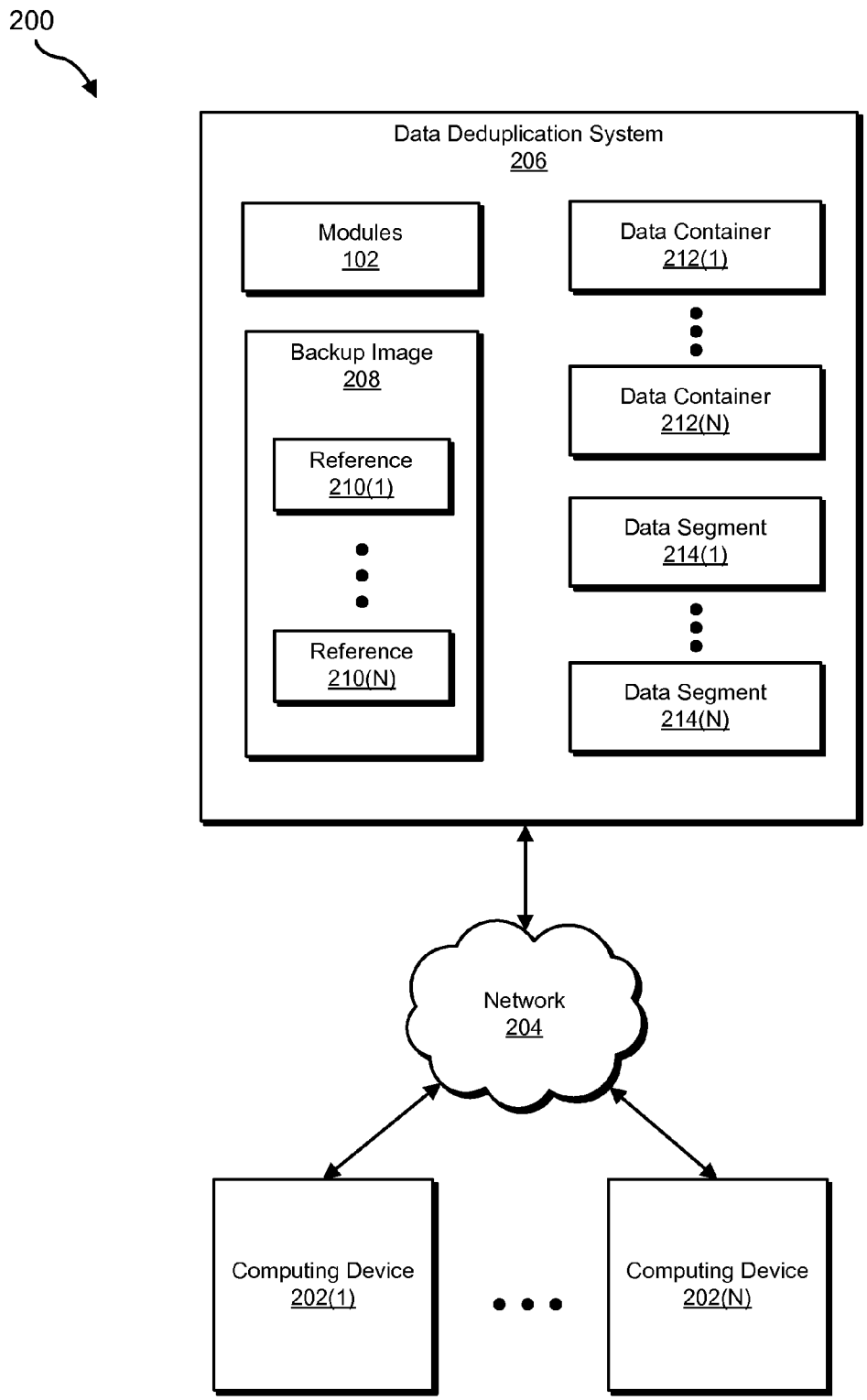
FIG. 2 is a block diagram of an additional exemplary system for improving rehydration performance in data deduplication systems.

The following will provide, with reference to FIGS. 1 and 2, detailed descriptions of exemplary systems for improving rehydration performance in data deduplication systems. Detailed descriptions of corresponding computer-implemented methods will be provided in connection with FIG. 3. Detailed descriptions of an exemplary backup image and a set of exemplary data containers will be provided in connection with FIGS. 4 and 5, respectively. Detailed descriptions of an exemplary temporary array of references copied from a backup image will be provided in connection with FIG. 6. Detailed descriptions of a set of exemplary post-rebase data containers and an exemplary post-rebase backup image will be provided in connection with FIGS. 7 and 8, respectively. In addition, detailed descriptions of an exemplary computing system and network architecture capable of implementing one or more of the embodiments described herein will be provided in connection with FIGS. 9 and 10, respectively.

FIG. 1 is a block diagram of an exemplary system 100 for improving rehydration performance in data deduplication systems. As illustrated in this figure, exemplary system 100 may include one or more modules 102 for performing one or more tasks. For example, and as will be explained in greater detail below, exemplary system 100 may include an identification module 104 that identifies a set of data containers that include data segments referenced by a backup image stored in a data deduplication system. Exemplary system 100 may also include a determination module 106 that (1) determines the total number of data segments referenced by the backup image that are included in a data container within the set of data containers and (2) determines that the total number of data segments that are referenced by the backup image and included in the data container is below a certain threshold.

In addition, and as will be described in greater detail below, exemplary system 100 may include a rebase module 108 that rebases the data segments that are referenced by the backup image and included in the data container to at least one other data container to decrease the total number of data containers that include the data segments referenced by the backup image. Although illustrated as separate elements, one or more of modules 102 in FIG. 1 may represent portions of a single module or application (such as SYMANTEC BACKUP EXEC, SYMANTEC NETBACKUP, SYMANTEC NORTON GHOST, ACRONIS TRUE IMAGE, ACRONIS BACKUP & RECOVERY, GENIE BACKUP HOME, COMMVAULT SIMPANA, SYSTEM RESTORE, and/or SYNCBACK).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing devices 202(1)-(N) and/or data deduplication system 206), computing system 910 in FIG. 9, and/or portions of exemplary network architecture 1000 in FIG. 10. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include computing devices 202(1)-(N) in communication with a data deduplication system 206 via a network 204. In one example, one or more of computing devices 202(1)-(N) may be programmed with one or more of modules 102. Additionally or alternatively, data deduplication system 206 may be programmed with one or more of modules 102.

As shown in FIG. 2, data deduplication system 206 may include a backup image 208, data containers 212(1)-(N), and/or data segments 214(1)-(N). Data deduplication system 206 may also include various other backup images, data containers, and/or data segments that are not explicitly illustrated in FIG. 2. In some examples, backup image 208 may include a list of references 210(1)-(N) that reference at least some of data segments 214(1)-(N). In one example, although data segments 214(1)-(N) are not necessarily illustrated as being stored within data containers 212(1)-(N) in FIG. 2, data segments 214(1)-(N) may each be stored within one of data containers 212(1)-(N).

In one embodiment, one or more of modules 102 from FIG. 1 may, when executed by at least one processor of one of computing devices 202(1)-(N) and/or data deduplication system 206, enable computing devices 202(1)-(N) and/or data deduplication system 206 to improve rehydration performance in data deduplication systems. For example, and as will be described in greater detail below, one or more of modules 102 may cause one of computing devices 202(1)-(N) and/or data deduplication system 206 to (1) identify a set of data containers 212(1)-(N) that include data segments 214(1)-(N) referenced by backup image 208, (2) determine the total number of data segments 214(1)-(N) that are included in one of data containers 212(1)-(N), (3) determine that the total number of data segments 214(1)-(N) that are included in that data container is below a certain threshold, and then in response to the determination that the total number of data segments 214(1)-(N) included in that data container is below the certain threshold, (4) rebase those of data segments 214(1)-(N) that are included in that data container to at least one other data container (e.g., another one of data containers 212(1)-(N)) to decrease the total number of data containers that include data segments 214(1)-(N) referenced by backup image 208.

Computing devices 202(1)-(N) generally represents any type or form of computing device capable of reading computer-executable instructions. Examples of computing devices 202(1)-(N) include, without limitation, laptops, tablets, desktops, servers, cellular phones, Personal Digital Assistants (PDAs), multimedia players, embedded systems, wearable devices (e.g., smart watches, smart glasses, etc.), gaming consoles, client devices, combinations of one or more of the same, exemplary computing system 910 in FIG. 9, or any other suitable computing device.

Data deduplication system 206 generally represents any type or form of computing and/or storage device capable of backing up, deduplicating, and/or restoring data segments, files, and/or backup images. Examples of data deduplication system 206 include, without limitation, deduplication servers, Hard Disk Drives (HDDs), Solid-State Drives (SSDs), disk controllers, volume managers, Redundant Array of Independent Disks (RAIDs), RAID controllers, virtual disks, variations of one or more of the same, combinations of one or more of the same, exemplary computing system 910 in FIG. 9, or any other data deduplication systems. In one example, data deduplication system 206 may perform network-wide data deduplication on data segments backed up from computing devices 202(1)-(N). The term "network-wide data deduplication," as used herein, generally refers to any type or form data deduplication performed on network-wide data collected from multiple client devices (e.g., computing devices 202(1)-(N) in FIG. 2). This network-wide data deduplication may include block-level and/or file-level data deduplication.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, a Power Line Communications (PLC) network, a cellular network (e.g., a Global System for Mobile Communications (GSM) network), exemplary network architecture 1000 in FIG. 10, or the like. Network 204 may facilitate communication or data transfer using wireless or wired connections. In one embodiment, network 204 may facilitate communication between among computing devices 202(1)-(N) and data deduplication system 206.

Backup image 208 generally refers to any type or form of stored copy and/or image that facilitates restoration of at least a portion of a computing device to a previous state. In one example, backup image 208 may include various files and/or data backed up from computing device 202(1) or computing device 202(N). Additionally or alternatively, backup image 208 may include various metadata backed up from computing device 202(1) or computing device 202(N). Examples of backup image 208 include, without limitation, full backup images, incremental backup images, differential backup images, accelerated backup images, deduplicated backup images, synthetic backup images, snapshots, variations of one or more of the same, combinations of one or more of the same, or any other suitable backup images.

References 210(1)-(N) generally represent any type or form of reference and/or identifier that identifies or otherwise indicates a location of a specific data segment within a data deduplication system. In one example, references 210(1)-(N) may each reference and/or identify a specific data segment and/or a specific data container that includes the specific data segment. For example, reference 210(1) may indicate that data segment 214(1) is stored and/or included in data container 212(1). Examples of references 210(1)-(N) include, without limitation, fingerprints, hashes, pointers, addresses, variations of one or more of the same, combinations of one or more of the same, or any other suitable references.

Data segments 214(1)-(N) generally represent any type or form of section, chunk, and/or block of data. In some examples, data segments 214(1)-(N) may each represent at least a portion of a file and/or object backed up from one or more of computing devices 202(1)-(N). Additionally or alternatively, data segments 214(1)-(N) may each be stored and/or included in one of data containers 212(1)-(N).

Data containers 212(1)-(N) generally represent any type or form of data structure that stores data segments within a data deduplication system. In some examples, data containers 212(1)-(N) may each include and/or represent distinct memory allocations of data deduplication system 206. In one example, the size of data containers 212(1)-(N) may expand and/or contract depending on the number of data segments that are included and/or stored in data containers 212(1)-(N). Additionally or alternatively, the size of data containers 212(1)-(N) may remain substantially constant regardless of the number of data segments that are included and/or stored in data containers 212(1)-(N).

Figure 3:
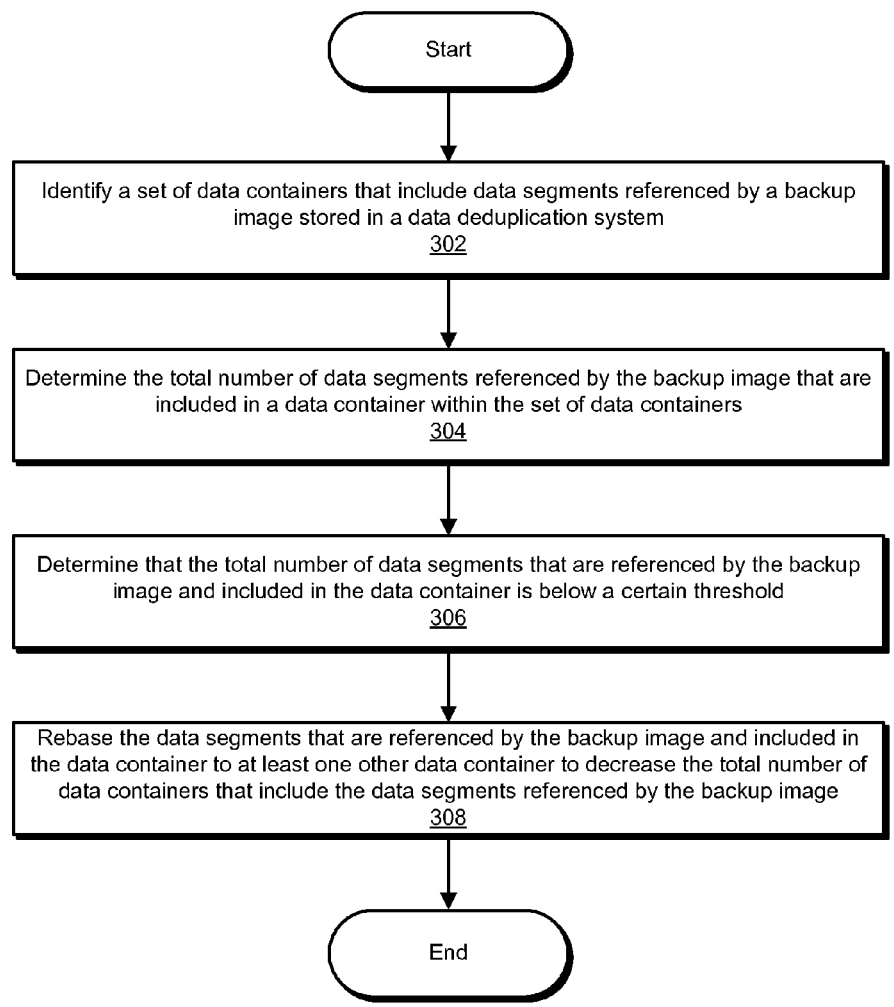
FIG. 3 is a flow diagram of an exemplary method for improving rehydration performance in data deduplication systems.

FIG. 3 is a flow diagram of an exemplary computer-implemented method 300 for improving rehydration performance in data deduplication systems. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 910 in FIG. 9, and/or portions of exemplary network architecture 1000 in FIG. 10.

As illustrated in FIG. 3, at step 302 one or more of the systems described herein may identify a set of data containers that include data segments referenced by a backup image stored in a data deduplication system. For example, identification module 104 may, as part of data deduplication system 206 in FIG. 2, identify set of data containers 212(1)-(N) that include data segments 214(1)-(N) referenced by backup image 208. In this example, backup image 208 may include and/or represent a backup of one of computing devices 202(1)-(N).

In one example, set of data containers 212(1)-(N) may include and/or represent a subset of all the data containers within data deduplication system 206. In other words, data deduplication system 206 may have other data containers (besides set of data containers 212(1)-(N)) that include data segments that are not referenced by backup image 208. Additionally or alternatively, set of data containers 212(1)-(N) may also include certain data segments that are not referenced by backup image 208.

The systems described herein may perform step 302 in a variety of ways. In some examples, identification module 104 may identify set of data containers 212(1)-(N) by scanning backup image 208. In one example, identification module 104 may be configured to scan backup image 208 in response to a certain event triggered within data deduplication system 206. For example, identification module 104 may be configured to scan backup image 208 upon completion of the upload of backup image 208 to data deduplication system 206. Additionally or alternatively, identification module 104 may be configured to scan backup image 208 on a periodic basis to determine whether any rebasing of data segments is needed.

While scanning backup image 208, identification module 104 may collect and/or compile various information and/or data about backup image 208. For example, identification module 104 may identify each of references 210(1)-(N) included in backup image 208. In this example, references 210(1)-(N) may each reference one of data segments 214(1)-(N) stored and/or included in set of data containers 212(1)-(N).

In one example, identification module 104 may identify each of data segments 214(1)-(N) referenced by references 210(1)-(N) included in backup image 208. Additionally or alternatively, identification module 104 may identify each of data containers 212(1)-(N) that store and/or include at least one data segment referenced by references 210(1)-(N).

Figure 4:
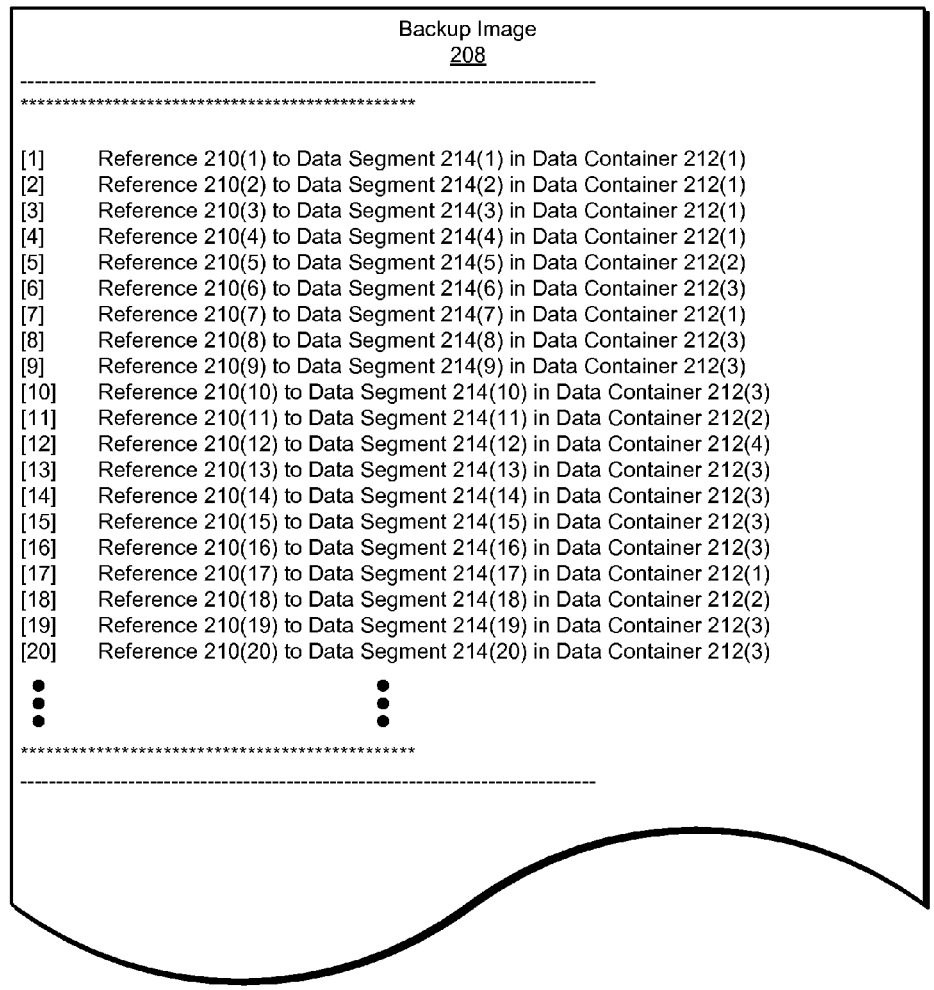
FIG. 4 is an illustration of an exemplary backup image stored on a data deduplication system.

As a specific example, identification module 104 may scan backup image 208 in FIG. 4. During this scan, identification module 104 may identify a list of references that are referenced by backup image 208. As illustrated in FIG. 4, this list of references may include reference 210(1) through reference 210(20). In this example, references 210(1)-(20) may reference and/or point to a set of data segments that include data segment 214(1) through data segment 214(20).

Continuing with the above example, these references may each have an index position that identifies and/or represents the reference's relative positioning within backup image 208. For example, reference 210(1) may have an original index position of [1] within backup image 208. Additionally or alternatively, reference 210(20) may have an original index position of [20] within backup image 208.

As illustrated in FIG. 4, these references may also identify and/or indicate which data container stores and/or includes a particular data segment. For example, reference 210(1) may indicate that data segment 214(1) is stored and/or included in data container 212(1). Additionally or alternatively, reference 210(20) may indicate that data segment 214(20) is stored and/or included in data container 212(3).

Accordingly, identification module 104 may enumerate and/or iterate over all of the references that are referenced by backup image 208. As a result of this enumeration and/or these iterations, identification module 104 may identify (1) each reference included in backup image 208, (2) each data segment referenced by any of the references included in backup image 208, and/or (3) each data container that stores and/or includes any data segments referenced by backup image 208.

Figure 5:
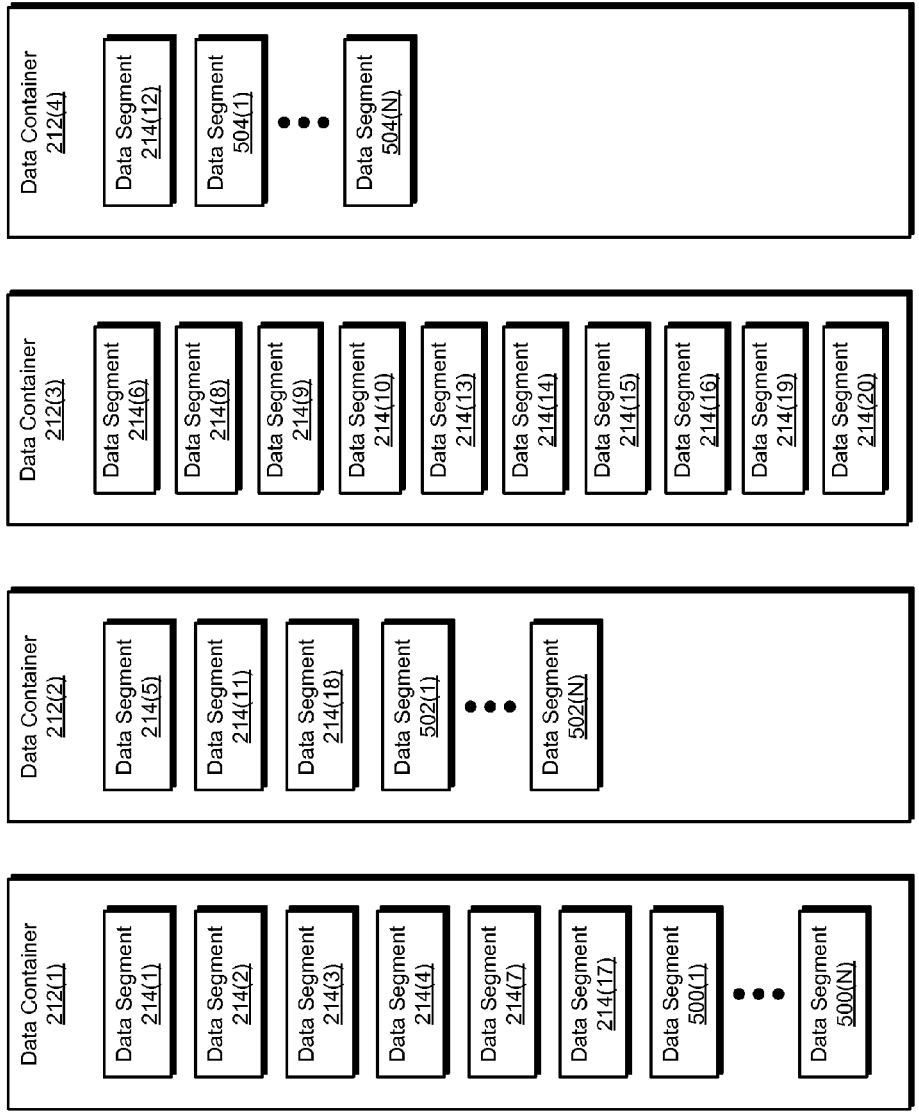
FIG. 5 is a block diagram of a set of exemplary data containers within a data deduplication system.

FIG. 5 illustrates an exemplary set of data containers 212(1)-(4) that are consistent with backup image 208 in FIG. 4. As illustrated in FIG. 5, data container 212(1) may store and/or include data segments 214(1), 214(2), 214(3), 214(4), 214(7), 214(17), and 500(1)-(N). In this example, data container 212(2) may store and/or include data segments 214(5), 214(11), 214(18), and 502(1)-(N). In addition, data container 212(3) may store and/or include data segments 214(6), 214(8), 214(9), 214(10), 214(13), 214(14), 214(15), 214(16), 214(19), and 214(20). Moreover, data container 212(4) may store and/or include data segments 214(12) and 504(1)-(N).

In one example, data segments 500(1)-(N), 502(1)-(N), and 504(1)-(N) may all represent data segments that are not referenced by backup image 208. In other words, data segments 500(1)-(N), 502(1)-(N), and 504(1)-(N) may all represent data segments referenced by at least one other backup image (not illustrated in FIG. 2) that is stored on data deduplication system 206.

In one example, rebase module 108 may copy set of references 210(1)-(N) from backup image 208 to a temporary array within data deduplication system 206. Upon copying set of references 210(1)-(N) to the temporary array, rebase module 108 may reorder set of references 210(1)-(N) within the temporary array based at least in part on (1) the total number of data segments 214(1)-(N) that are referenced by set of references 210(1)-(N) and included in any single data container, (2) the total data size of data segments 214(1)-(N) that are referenced by set of references 210(1)-(N) and included in any single data container, and/or (3) the original index positions of set of references 210(1)-(N) within backup image 208.

As a specific example, rebase module 108 may copy set of references 210(1)-(20) from backup image 208 in FIG. 4 to a temporary array 600 in FIG. 6. Upon copying set of references 210(1)-(20) to temporary array 600, rebase module 108 may reorder and/or sort set of references 210(1)-(20) within temporary array 600 such that the references are grouped together based on the data container that stores and/or includes their corresponding data segments. For example, references 210(5), 210(11), and 210(18) may be grouped together since those references are all stored and/or included in data container 212(2). Similarly, references 210(1), 210(2), 210(3), 210(4), 210(7), and 210(17) may be grouped together since those references are all stored and/or included in data container 212(1). Additionally or alternatively, references 210(6), 210(8), 210(9), 210(10), 210(13), 210(14), 210(15), 210(16), 210(19), and 210(20) may be grouped together since those references are all stored and/or included in data container 212(3).

Moreover, rebase module 108 may further reorder and/or sort set of references 210(1)-(20) within temporary array 600 in order of the number of references included in each container-specific grouping. For example, rebase module 108 may list and/or place the container-specific grouping that includes the fewest number of references ahead of the container-specific grouping that includes any higher number of references. As a specific example, rebase module 108 may list and/or place the reference stored and/or included in data container 212(4) ahead of the references stored and/or included in data containers 212(2), 212(1), and 212(3) within temporary array 600.

Additionally or alternatively, rebase module 108 may further reorder and/or sort some of the references within the temporary array in order of the total data size of the data segments referenced by each container-specific grouping of references. For example, in the event that any container-specific groupings include the same number of references as one another, rebase module 108 may list and/or place the container-specific grouping that references the fewest number of bytes ahead of the container-specific grouping that references any higher number of bytes.

Furthermore, rebase module 108 may further reorder and/or sort some of the references in order of their original index positions within backup image 208. For example, identification module 104 may identify references 210(1)-(4), 210(7), and 210(17) as all being stored and/or included in data container 212(1). In this example, determination module 106 may determine that the original index position of reference 210(1) is ahead of the original index position of references 210(2)-(4), 210(7), and 210(17) within backup image 208 in FIG. 4. As a result, rebase module 108 may list, place, and/or maintain reference 210(1) ahead of references 210(2)-(4), 210(7), and 210(17) in their container-specific grouping within temporary array 600 in FIG. 6.

Returning to FIG. 3, at step 304 one or more of the systems described herein may determine the total number of data segments referenced by the backup image that are included in a data container within the set of data containers. For example, determination module 106 may, as part of data deduplication system 206 in FIG. 2, determine the total number of data segments 214(1)-(N) referenced by backup image 208 that are included in any one of data containers 212(1)-(N). In one example, determination module 106 may determine the total number of data segments 214(1)-(N) referenced by backup image 208 that are included in data container 212(1). Additionally or alternatively, determination module 106 may determine the total number of data segments 214(1)-(N) referenced by backup image 208 that are included in data container 212(N).

The systems described herein may perform step 304 in a variety of ways. In some examples, determination module 106 may determine the total number of data segments 214(1)-(N) referenced by backup image 208 that are included in the data container based at least in part on the scan. For example, determination module 106 may count up the number of data segments 214(1)-(N) identified as being stored and/or included in the data container in question during the scan. Additionally or alternatively, determination module 106 may count up the number of data segments 214(1)-(N) identified as being stored and/or included in the data container in question after completion of the scan.

In one example, determination module 106 may count up the number of data segments 214(1)-(N) identified as being stored and/or included in the data container in question by analyzing temporary array 600 in FIG. 6. For example, determination module 106 may enumerate and/or iterate over references 210(1)-(20) within temporary array 600 by starting from index position [1] and continuing through index position [20]. In this example, determination module 106 may determine that (1) data container 212(4) is storing one data segment referenced by backup image 208, (2) data container 212(2) is storing three data segments referenced by backup image 208, (3) data container 212(1) is storing six data segments referenced by backup image 208, and (4) data container 212(3) is storing ten data segments referenced by backup image 208.

Returning to FIG. 3, at step 306 one or more of the systems described herein may determine that the total number of data segments that are referenced by the backup image and included in the data container is below a certain threshold. For example, determination module 106 may, as part of data deduplication system 206 in FIG. 2, determine that the total number of data segments 214(1)-(N) that are referenced by backup image 208 and included in any single data container is below a certain threshold. In one example, determination module 106 may determine that the total number of data segments 214(1)-(N) that are referenced by backup image 208 and included in data container 212(1) is below a certain threshold. Additionally or alternatively, determination module 106 may determine that the total number of data segments 214(1)-(N) that are referenced by backup image 208 and included in data container 212(N) is below a certain threshold.

The systems described herein may perform step 306 in a variety of ways. In some examples, determination module 106 may make this determination by comparing the total number of data segments 214(1)-(N) that are referenced by backup image 208 and included in the data container against a fixed threshold. For example, determination module 106 may compare the total number of data segments 214(1)-(N) that are referenced by backup image 208 and included in the data container against a fixed number threshold. Additionally or alternatively, determination module 106 may compare the total number of data segments 214(1)-(N) that are referenced by backup image 208 and included in the data container to a fixed percentage threshold. In this example, the fixed percentage threshold may correspond to and/or represent a ratio of the number of data segments that are referenced by backup image 208 and included in the data container to the number of data segments that are not referenced by backup image 208 but are nonetheless included in the data container.

In other examples, determination module 106 may make this determination by comparing the total number of data segments 214(1)-(N) that are referenced by backup image 208 and included in the data container against a dynamically calculated threshold. For example, determination module 106 may dynamically calculate the threshold based at least in part on the total number of data segments 214(1)-(N) referenced by backup image 208 and the total number of data containers 212(1)-(N) that include those data segments. In one example, the dynamically calculated threshold may be represented as Effective Threshold=Weight×Threshold Value, where $$Weight = \frac{Configurable\ Locality\ Baseline \times Total\ Number\ of\ Data\ Containers\ Referenced\ by\ Backup\ Image}{Total\ Number\ of\ Data\ Segments\ Refereced\ by\ Backup\ Image}$$

so long as Weight >1. In the event that Weight <1, the dynamically calculated threshold may be represented as Effective Threshold=Threshold Value.

Returning to FIG. 3, at step 308 one or more of the systems described herein may rebase the data segments that are referenced by the backup image and included in the data container to at least one other data container to decrease the total number of data containers that include the data segments referenced by the backup image. For example, rebase module 108 may, as part of data deduplication system 206 in FIG. 2, rebase those of data segments 214(1)-(N) that are referenced by backup image 208 and included in the data container in question to another data container. Rebase module 108 may initiate this rebase operation in response to the determination that the total number of data segments 214(1)-(N) that are referenced by backup image 208 and included in that data container is below the threshold.

By rebasing those data segments from one data container to another in this way, rebase module 108 may be able to decrease the total number of data containers that include data segments 214(1)-(N) referenced by backup image 208. Moreover, by decreasing the number of data containers that include data segments 214(1)-(N) referenced by backup image 208, rebase module 108 may be able to improve the locality of data segments 214(1)-(N) referenced by backup image 208. In addition, by improving the locality of those data segments, rebase module 108 may decrease the amount of time needed to read and/or restore files that include those data segments from data deduplication system 206, thereby improving the rehydration performance of backup image 208.

The systems described herein may perform step 308 in a variety of ways. In some examples, rebase module 108 may move and/or copy those of data segments 214(1)-(N) included in the data container in question to at least one other data container within data containers 212(1)-(N). In other examples, rebase module 108 may move and/or copy those of data segments 214(1)-(N) included in the data container in question to at least one other data container that did not necessarily store and/or include any of data segments 214(1)-(N) referenced by backup image 208 prior to the rebase operation. For example, rebase module 108 may move and/or copy a large number of data segments 214(1)-(N) from various data containers to a new data container that has enough space to store the large number of data segments.

Figure 7:
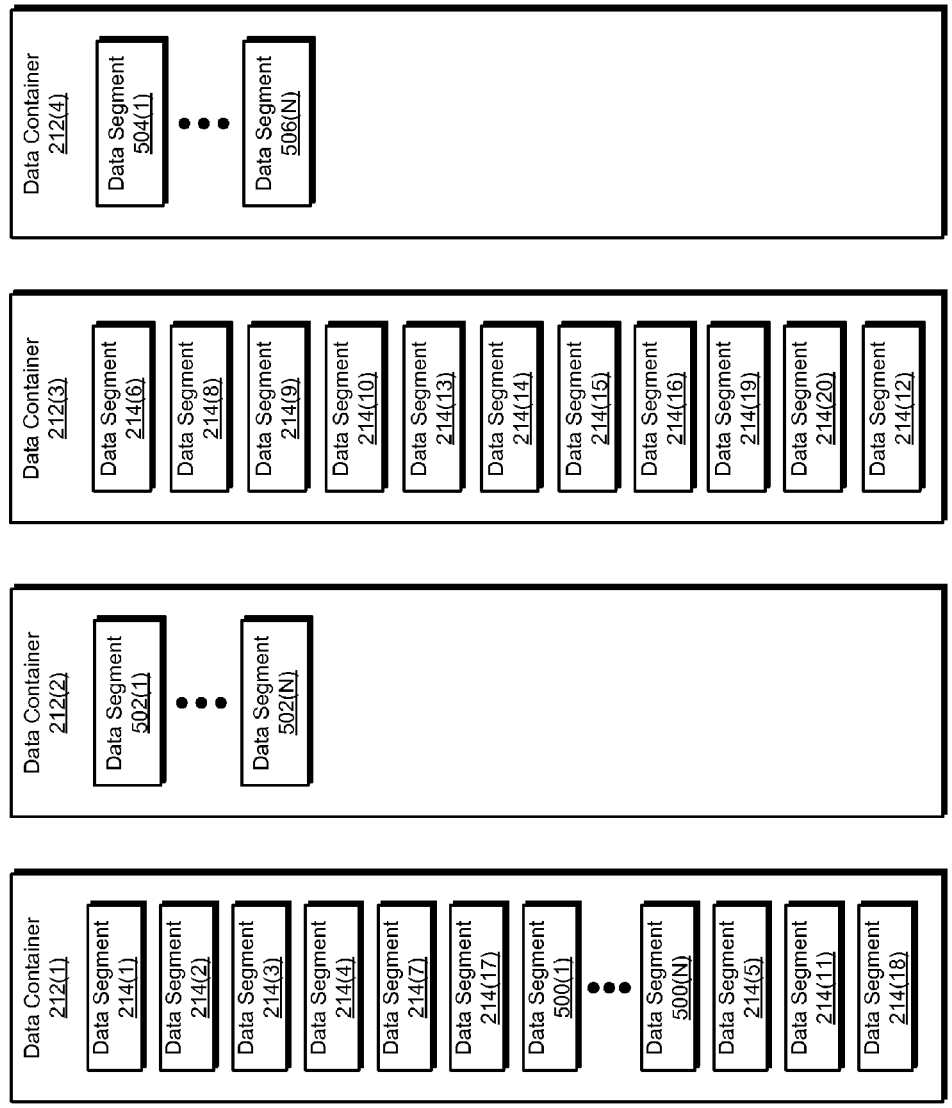
FIG. 7 is a block diagram of a set of exemplary data containers within a data deduplication system after undergoing a rebase operation.

FIG. 7 illustrates the exemplary set of data containers 212(1)-(4) in FIG. 5 after undergoing a rebase operation. In this example, rebase module 108 may have rebased data segments 214(5), 214(11), and 214(18) from data container 212(2) to data container 212(1). Similarly, rebase module 108 may have rebased data segment 214(12) from data container 212(4) to data container 212(3). As illustrated in FIG. 5, after the rebase operation, data container 212(1) may store and/or include data segments 214(1), 214(2), 214(3), 214(4), 214(7), 214(17), 500(1)-(N), 214(5), 214(11), and 214(18). In this example, data container 212(2) may store and/or include only data segments 502(1)-(N). In addition, data container 212(3) may store and/or include data segments 214(6), 214(8), 214(9), 214(10), 214(13), 214(14), 214(15), 214(16), 214(19), 214(20), and 214(12). Moreover, data container 212(4) may store and/or include only data segments 504(1)-(N).

In some examples, rebase module 108 may also update backup image 208 to account for the data segments that have been rebased from one data container to another. For example, rebase module 108 may update backup image 208 in FIG. 4 to form a rebased backup image 800 in FIG. 8. In this example, rebased backup image 800 may account for and/or reflect the changes made to data containers 212(1)-(4) in FIG. 5 during the rebase operation. In other words, rebased backup image 800 may correspond to and/or be consistent with data containers 212(1)-(4) in FIG. 7 after having undergone the rebase operation.

As illustrated in FIG. 8, rebased backup image 800 may indicate that data segments 214(5), 214(11), and 214(18) are now stored and/or included in data container 212(1) instead of data container 212(2) after completion of the rebase operation. Additionally or alternatively, rebased backup image 800 may indicate that data segment 214(12) is now stored and/or included in data container 212(3) instead of data container 212(4) after completion of the rebase operation.

In some examples, the systems and methods described herein may apply to replication technologies in addition to backup technologies. For example, a replication system may replicate backup image 208 by making a copy of backup image 208 and then moving the copy to another storage device in a remote domain (not explicitly illustrated in FIG. 2). By moving this copy to the other storage device, the replication system may facilitate high availability of backup image 208 by ensuring that backup image 208 is always available at either the local domain or the remote domain even in the event that one of these domains experiences a failure and/or data corruption.

In one example, one or more of modules 102 may cause one of computing devices 202(1)-(N) and/or data deduplication system 206 to replicate backup image 208 to another computing and/or storage device (not necessarily illustrated in FIG. 2). In this example, during the replication process and/or as part of the replication process, one or more of modules 102 may cause one of computing devices 202(1)-(N) and/or data deduplication system 206 to (1) identify a set of data containers that include copies of data segments 214(1)-(N) referenced by a copy of backup image 208, (2) determine the total number of the copies of data segments 214(1)-(N) that are included in one of the data containers, (3) determine that the total number of the copies of data segments 214(1)-(N) that are included in that data container is below a certain threshold, and then in response to the determination that the total number of the copies of data segments 214(1)-(N) included in that data container is below the certain threshold, (4) rebase those copies of data segments 214(1)-(N) that are included in that data container to at least one other data container to decrease the total number of data containers that include the copies of data segments 214(1)-(N) referenced by the copy of backup image 208.

Accordingly, the systems and methods described herein may be able to perform such a rebase operation on the target or destination device in connection with the replication process. Additionally or alternatively, the systems and methods described herein may be able to perform such a rebase operation on the origin or source device in connection with the replication process.

Figure 9:
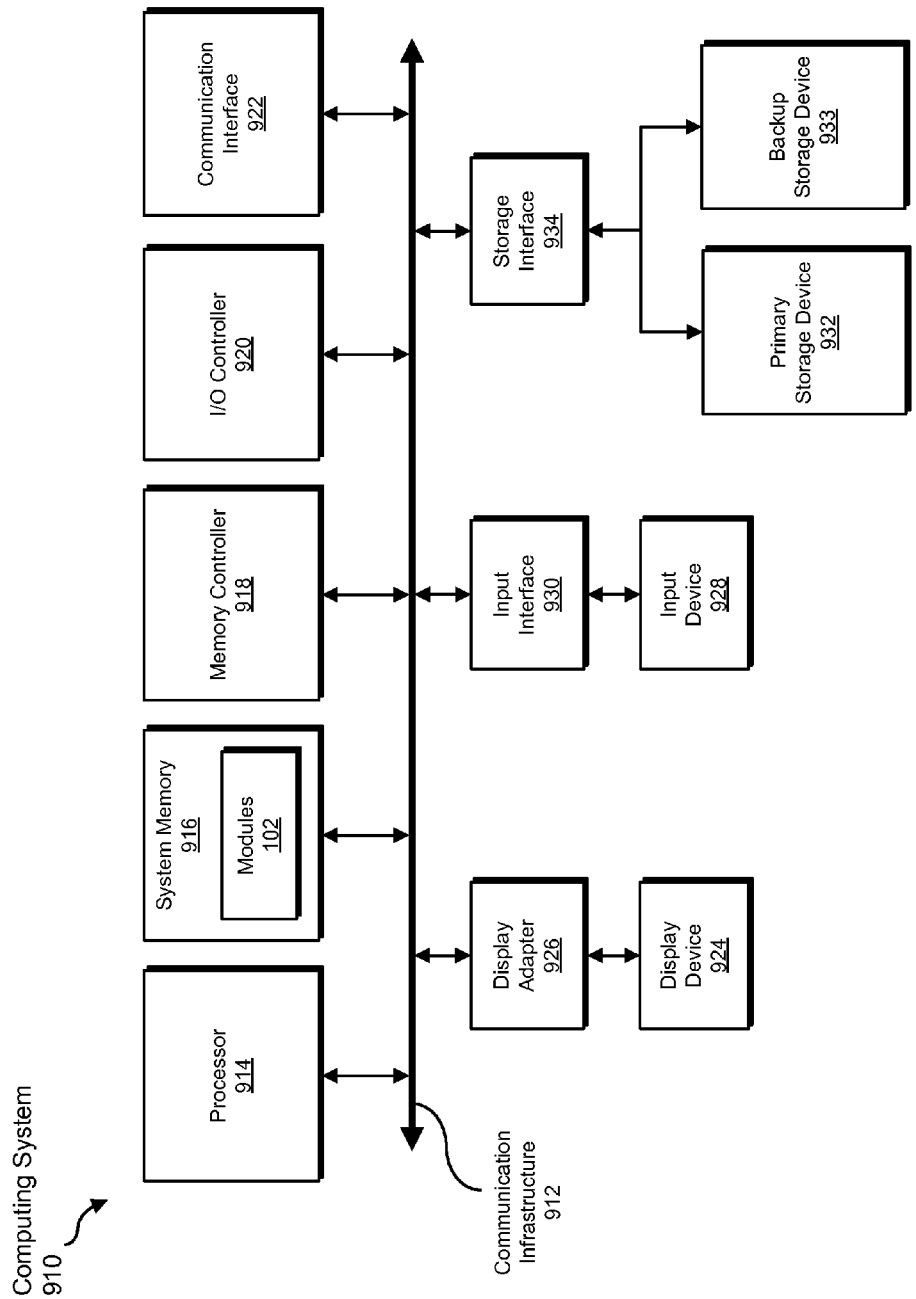
FIG. 9 is a block diagram of an exemplary computing system capable of implementing one or more of the embodiments described and/or illustrated herein.

FIG. 9 is a block diagram of an exemplary computing system 910 capable of implementing one or more of the embodiments described and/or illustrated herein. For example, all or a portion of computing system 910 may perform and/or be a means for performing, either alone or in combination with other elements, one or more of the steps described herein (such as one or more of the steps illustrated in FIG. 3). All or a portion of computing system 910 may also perform and/or be a means for performing any other steps, methods, or processes described and/or illustrated herein.

Computing system 910 broadly represents any single or multi-processor computing device or system capable of executing computer-readable instructions. Examples of computing system 910 include, without limitation, workstations, laptops, client-side terminals, servers, distributed computing systems, handheld devices, or any other computing system or device. In its most basic configuration, computing system 910 may include at least one processor 914 and a system memory 916.

Processor 914 generally represents any type or form of physical processing unit (e.g., a hardware-implemented central processing unit) capable of processing data or interpreting and executing instructions. In certain embodiments, processor 914 may receive instructions from a software application or module. These instructions may cause processor 914 to perform the functions of one or more of the exemplary embodiments described and/or illustrated herein.

System memory 916 generally represents any type or form of volatile or non-volatile storage device or medium capable of storing data and/or other computer-readable instructions. Examples of system memory 916 include, without limitation, Random Access Memory (RAM), Read Only Memory (ROM), flash memory, or any other suitable memory device. Although not required, in certain embodiments computing system 910 may include both a volatile memory unit (such as, for example, system memory 916) and a non-volatile storage device (such as, for example, primary storage device 932, as described in detail below). In one example, one or more of modules 102 from FIG. 1 may be loaded into system memory 916.

In certain embodiments, exemplary computing system 910 may also include one or more components or elements in addition to processor 914 and system memory 916. For example, as illustrated in FIG. 9, computing system 910 may include a memory controller 918, an Input/Output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an Industry Standard Architecture (ISA), Peripheral Component Interconnect (PCI), PCI Express (PCIe), or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912.

I/O controller 920 generally represents any type or form of module capable of coordinating and/or controlling the input and output functions of a computing device. For example, in certain embodiments I/O controller 920 may control or facilitate transfer of data between one or more elements of computing system 910, such as processor 914, system memory 916, communication interface 922, display adapter 926, input interface 930, and storage interface 934.

Communication interface 922 broadly represents any type or form of communication device or adapter capable of facilitating communication between exemplary computing system 910 and one or more additional devices. For example, in certain embodiments communication interface 922 may facilitate communication between computing system 910 and a private or public network including additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 922 may also allow computing system 910 to engage in distributed or remote computing. For example, communication interface 922 may receive instructions from a remote device or send instructions to a remote device for execution.

As illustrated in FIG. 9, computing system 910 may also include at least one display device 924 coupled to communication infrastructure 912 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer, as known in the art) for display on display device 924.

As illustrated in FIG. 9, exemplary computing system 910 may also include at least one input device 928 coupled to communication infrastructure 912 via an input interface 930. Input device 928 generally represents any type or form of input device capable of providing input, either computer or human generated, to exemplary computing system 910. Examples of input device 928 include, without limitation, a keyboard, a pointing device, a speech recognition device, or any other input device.

As illustrated in FIG. 9, exemplary computing system 910 may also include a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a solid state drive, a floppy disk drive, a magnetic tape drive, an optical disk drive, a flash drive, or the like. Storage interface 934 generally represents any type or form of interface or device for transferring data between storage devices 932 and 933 and other components of computing system 910.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also include other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems.

Many other devices or subsystems may be connected to computing system 910. Conversely, all of the components and devices illustrated in FIG. 9 need not be present to practice the embodiments described and/or illustrated herein. The devices and subsystems referenced above may also be interconnected in different ways from that shown in FIG. 9. Computing system 910 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 910. All or a portion of the computer program stored on the computer-readable medium may then be stored in system memory 916 and/or various portions of storage devices 932 and 933. When executed by processor 914, a computer program loaded into computing system 910 may cause processor 914 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 910 may be configured as an Application Specific Integrated Circuit (ASIC) adapted to implement one or more of the exemplary embodiments disclosed herein.

Figure 10:
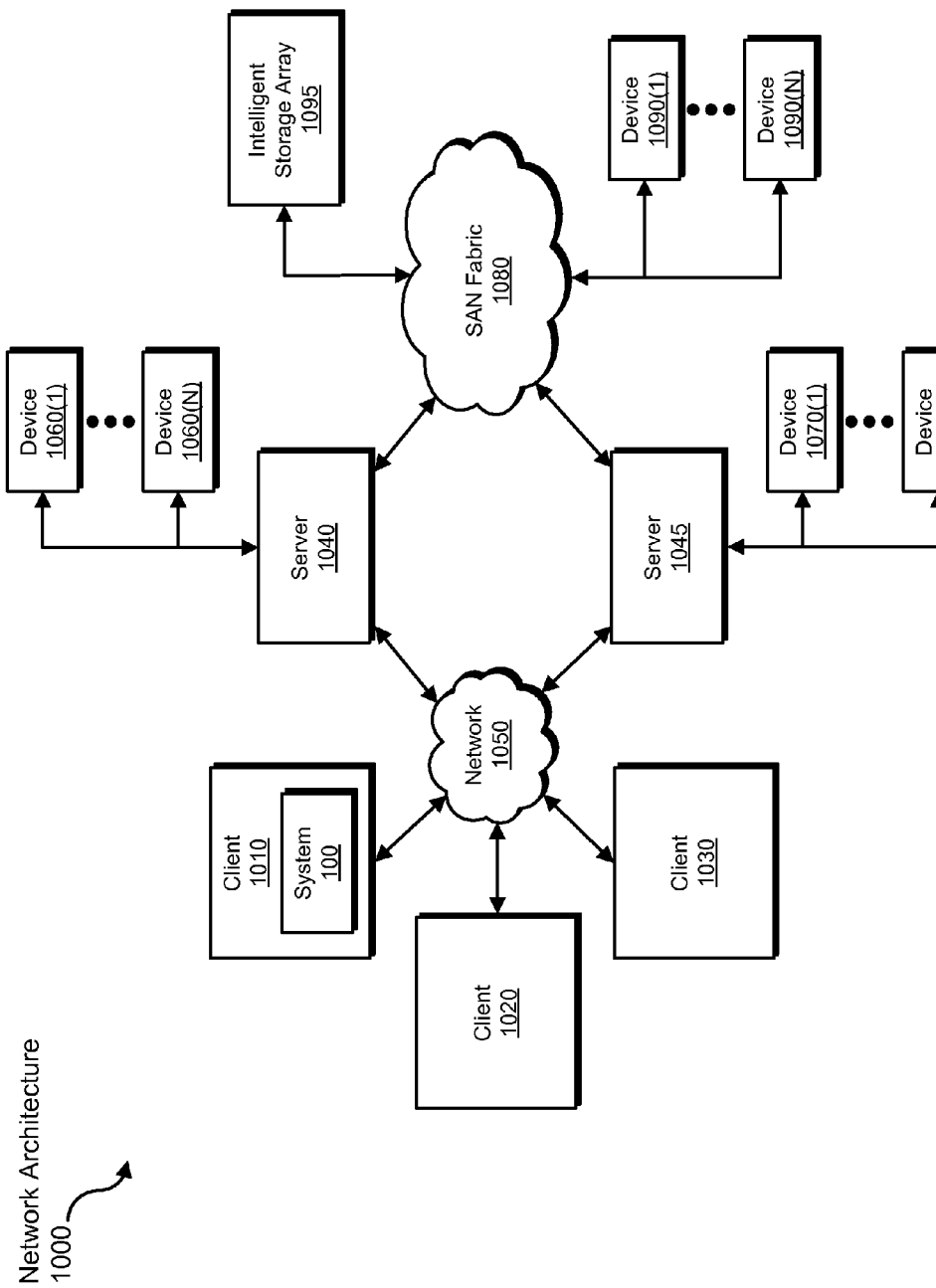
FIG. 10 is a block diagram of an exemplary computing network capable of implementing one or more of the embodiments described and/or illustrated herein.

FIG. 10 is a block diagram of an exemplary network architecture 1000 in which client systems 1010, 1020, and 1030 and servers 1040 and 1045 may be coupled to a network 1050. As detailed above, all or a portion of network architecture 1000 may perform and/or be a means for performing, either alone or in combination with other elements, one or more of the steps disclosed herein (such as one or more of the steps illustrated in FIG. 3). All or a portion of network architecture 1000 may also be used to perform and/or be a means for performing other steps and features set forth in the instant disclosure.

Client systems 1010, 1020, and 1030 generally represent any type or form of computing device or system, such as exemplary computing system 910 in FIG. 9. Similarly, servers 1040 and 1045 generally represent computing devices or systems, such as application servers or database servers, configured to provide various database services and/or run certain software applications. Network 1050 generally represents any telecommunication or computer network including, for example, an intranet, a WAN, a LAN, a PAN, or the Internet. In one example, client systems 1010, 1020, and/or 1030 and/or servers 1040 and/or 1045 may include all or a portion of system 100 from FIG. 1.

As illustrated in FIG. 10, one or more storage devices 1060(1)-(N) may be directly attached to server 1040. Similarly, one or more storage devices 1070(1)-(N) may be directly attached to server 1045. Storage devices 1060(1)-(N) and storage devices 1070(1)-(N) generally represent any type or form of storage device or medium capable of storing data and/or other computer-readable instructions. In certain embodiments, storage devices 1060(1)-(N) and storage devices 1070(1)-(N) may represent Network-Attached Storage (NAS) devices configured to communicate with servers 1040 and 1045 using various protocols, such as Network File System (NFS), Server Message Block (SMB), or Common Internet File System (CIFS).

Servers 1040 and 1045 may also be connected to a Storage Area Network (SAN) fabric 1080. SAN fabric 1080 generally represents any type or form of computer network or architecture capable of facilitating communication between a plurality of storage devices. SAN fabric 1080 may facilitate communication between servers 1040 and 1045 and a plurality of storage devices 1090(1)-(N) and/or an intelligent storage array 1095. SAN fabric 1080 may also facilitate, via network 1050 and servers 1040 and 1045, communication between client systems 1010, 1020, and 1030 and storage devices 1090(1)-(N) and/or intelligent storage array 1095 in such a manner that devices 1090(1)-(N) and array 1095 appear as locally attached devices to client systems 1010, 1020, and 1030. As with storage devices 1060(1)-(N) and storage devices 1070(1)-(N), storage devices 1090(1)-(N) and intelligent storage array 1095 generally represent any type or form of storage device or medium capable of storing data and/or other computer-readable instructions.

In certain embodiments, and with reference to exemplary computing system 910 of FIG. 9, a communication interface, such as communication interface 922 in FIG. 9, may be used to provide connectivity between each client system 1010, 1020, and 1030 and network 1050. Client systems 1010, 1020, and 1030 may be able to access information on server 1040 or 1045 using, for example, a web browser or other client software. Such software may allow client systems 1010, 1020, and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1040, server 1045, storage devices 1060(1)-(N), storage devices 1070(1)-(N), storage devices 1090(1)-(N), intelligent storage array 1095, or any combination thereof. All or a portion of one or more of the exemplary embodiments disclosed herein may also be encoded as a computer program, stored in server 1040, run by server 1045, and distributed to client systems 1010, 1020, and 1030 over network 1050.

As detailed above, computing system 910 and/or one or more components of network architecture 1000 may perform and/or be a means for performing, either alone or in combination with other elements, one or more steps of an exemplary method for improving rehydration performance in data deduplication systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data to be transformed, transform the data, output a result of the transformation to various data containers within a data deduplication system, use the result of the transformation to decrease the number of data containers referenced by a backup image, and store the result of the transformation to facilitate access to the transformed data. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for improving rehydration performance in data deduplication systems, at least a portion of the method being performed by a computing device comprising at least one processor, the method comprising:

identifying a set of data containers that include data segments referenced by a backup image stored in a data deduplication system by:
scanning the backup image;
while scanning the backup image:
identifying a set of references within the backup image that reference the data segments included in the set of data containers;
identifying, within the set of data containers, a first data container that includes a first data segment referenced by a first reference within the backup image;
identifying, within the set of data containers, a second data container that includes a second data segment referenced by a second reference within the backup image;
determining the total number of data segments that are referenced by the set of references within the backup image and included in the first data container;
determining the total number of data segments that are referenced by the set of references within the backup image and included in the second data container;
determining that the total number of data segments that are referenced by the set of references and included in the first data container is less than the total number of data segments that are referenced by the set of references and included in the second data container;
reordering the set of references such that the first reference is listed ahead of the second reference due at least in part to the total number of data segments that are referenced by the set of references and included in the first data container being less than the total number of data segments that are referenced by the set of references and included in the second data container;
determining the total number of data segments that are referenced by the backup image and included in a data container within the set of data containers;
determining that the total number of data segments that are referenced by the backup image and included in the data container is below a certain threshold;
in response to determining that the total number of data segments is below the certain threshold, rebasing the data segments that are referenced by the backup image and included in the data container to at least one other data container to decrease the total number of data containers that include the data segments referenced by the backup image.

2. The method of claim 1, wherein rebasing the data segments to the other data container comprises copying the data segments from the data container to at least one other data container within the set of data containers.

3. The method of claim 1, wherein rebasing the data segments to the other data container comprises copying the data segments from the data container to at least one other data container not included in the set of data containers.

4. The method of claim 1, further comprising updating the backup image to account for the data segments that have been rebased from the data container to the other data container.

5. The method of claim 1, wherein determining that the total number of data segments that are referenced by the backup image and included in the data container is below the certain threshold comprises dynamically calculating the certain threshold based at least in part on the total number of data segments referenced by the backup image and the total number of data containers that include the data segments referenced by the backup image.

6. A system for improving rehydration performance in data deduplication systems, the system comprising:
an identification module, stored in memory, that:
identifies a set of data containers that include data segments referenced by a backup image stored in a data deduplication system by:
scanning the backup image;
while scanning the backup image, identifying a set of references within the backup image that reference the data segments included in the set of data containers;
identifies, within the set of data containers, a first data container that includes a first data segment referenced by a first reference within the backup image;
identifies, within the set of data containers, a second data container that includes a second data segment referenced by a second reference within the backup image;
a determination module, stored in memory, that:
determines the total number of data segments that are referenced by the set of references within the backup image and included in the first data container;
determines the total number of data segments that are referenced by the set of references within the backup image and included in the second data container;
determines that the total number of data segments that are referenced by the set of references and included in the first data container is less than the total number of data segments that are referenced by the set of references and included in the second data container;
determines the total number of data segments that are referenced by the backup image and included in a data container within the set of data containers;
determines that the total number of data segments that are referenced by the backup image and included in the data container is below a certain threshold;
a rebase module, stored in memory, that:
reorders the set of references such that the first reference is listed ahead of the second reference due at least in part to the total number of data segments that are referenced by the set of references and included in the first data container being less than the total number of data segments that are referenced by the set of references and included in the second data container;
rebases, in response to the determination that the total number of data segments is below the certain threshold, the data segments that are referenced by the backup image and included in the data container to at least one other data container to decrease the total number of data containers that include the data segments referenced by the backup image;
at least one physical processor configured to execute the identification module, the determination module, and the rebase module.

7. The system of claim 6, wherein the rebase module rebases the data segments to the other data container by copying the data segments from the data container to at least one other data container within the set of data containers.

8. The system of claim 6, wherein the rebase module rebases the data segments to the other data container by copying the data segments from the data container to at least one other data container not included in the set of data containers.

9. The system of claim 6, wherein the rebase module updates the backup image to account for the data segments that have been rebased from the data container to the other data container.

10. A non-transitory computer-readable medium comprising one or more computer-executable instructions that, when executed by at least one processor of a computing device, cause the computing device to:
- identify a set of data containers that include data segments referenced by a backup image stored in a data deduplication system by:
  - scanning the backup image;
  - while scanning the backup image:
    - identifying a set of references within the backup image that reference the data segments included in the set of data containers;
    - identifying, within the set of data containers, a first data container that includes a first data segment referenced by a first reference within the backup image;
    - identifying, within the set of data containers, a second data container that includes a second data segment referenced by a second reference within the backup image;
- determine the total number of data segments that are referenced by the set of references within the backup image and included in the first data container;
- determine the total number of data segments that are referenced by the set of references within the backup image and included in the second data container;
- determine that the total number of data segments that are referenced by the set of references and included in the first data container is less than the total number of data segments that are referenced by the set of references and included in the second data container;
- reorder the set of references such that the first reference is listed ahead of the second reference due at least in part to the total number of data segments that are referenced by the set of references and included in the first data container being less than the total number of data segments that are referenced by the set of references and included in the second data container;
- determine the total number of data segments that are referenced by the backup image and included in a data container within the set of data containers;
- determine that the total number of data segments that are referenced by the backup image and included in the data container is below a certain threshold;
- rebase, in response to the determination that the total number of data segments is below the certain threshold, the data segments that are referenced by the backup image and included in the data container to at least one other data container to decrease the total number of data containers that include the data segments referenced by the backup image.

* * * * *

UNITED STATES PATENT AND TRADEMARK OFFICE
CERTIFICATE OF CORRECTION

PATENT NO. : 10,002,050 B1
APPLICATION NO. : 14/745501
DATED : June 19, 2018
INVENTOR(S) : Zhang Page 1 of 1

It is certified that error appears in the above-identified patent and that said Letters Patent is hereby corrected as shown below:

On the Title Page

In Item (73), under "Assignee", in Column 1, Line 2, delete "City," and insert -- View, --, therefor.

Signed and Sealed this
Twenty-ninth Day of January, 2019

Andrei Iancu
*Director of the United States Patent and Trademark Office*